(12) United States Patent
Lim

(10) Patent No.: US 11,988,174 B2
(45) Date of Patent: May 21, 2024

(54) THRUST CHAMBER INTEGRATED WITH IGNITER OF ROCKET ENGINE USING CRYOGENIC FUEL AND LIQUID OXYGEN AND ROCKET INCLUDING THE SAME

(71) Applicant: KOREA AEROSPACE RESEARCH INSTITUTE, Daejeon (KR)

(72) Inventor: Byoung Jik Lim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 169 days.

(21) Appl. No.: 17/501,370

(22) Filed: Oct. 14, 2021

(65) Prior Publication Data

US 2022/0120242 A1  Apr. 21, 2022

(30) Foreign Application Priority Data

Oct. 16, 2020 (KR) .................. 10-2020-0134624

(51) Int. Cl.
*F02K 9/95* (2006.01)
*F02K 9/52* (2006.01)
*F02K 9/64* (2006.01)

(52) U.S. Cl.
CPC .............. *F02K 9/95* (2013.01); *F02K 9/52* (2013.01); *F02K 9/64* (2013.01)

(58) Field of Classification Search
CPC ..................................... F02K 9/62; F02K 9/95
See application file for complete search history.

(56) References Cited

U.S. PATENT DOCUMENTS

| 2,523,656 | A | * | 9/1950 | Goddard | F02K 9/62 60/260 |
| 2,928,240 | A | * | 3/1960 | Burton | F02K 9/95 60/240 |
| 3,071,925 | A | * | 1/1963 | Benedict | F02K 9/52 60/39.463 |
| 3,106,059 | A | * | 10/1963 | Ledwith | F02K 9/52 60/39.821 |
| 3,136,123 | A | * | 6/1964 | Stein | F02K 9/52 60/39.821 |
| 3,263,418 | A | * | 8/1966 | Lange | F02K 9/64 60/39.76 |
| 3,597,923 | A | * | 8/1971 | Simon | F02K 9/44 60/260 |

(Continued)

FOREIGN PATENT DOCUMENTS

| JP | 2011017322 A | 1/2011 |
| JP | 2017510745 A | 4/2017 |

(Continued)

OTHER PUBLICATIONS

Office Action dated Mar. 24, 2022 in Koran Application No. 10-2020-0134624.

*Primary Examiner* — Lorne E Meade
(74) *Attorney, Agent, or Firm* — Panitch Schwarze Belisario & Nadel LLP

(57) ABSTRACT

Provided are an igniter-integrated thrust chamber for a rocket engine using a cryogenic fuel and liquid oxygen and a rocket including the thrust chamber. The thrust chamber includes a combustion chamber and a mixing head assembly, which is disposed at one side of the combustion chamber and is integrated with the combustion chamber.

18 Claims, 3 Drawing Sheets

(56) References Cited

U.S. PATENT DOCUMENTS

| | | | |
|---|---|---|---|
| 7,028,478 B2 * | 4/2006 | Prentice, III | F28F 21/083 |
| | | | 60/645 |
| 7,565,795 B1 * | 7/2009 | Horn | F02K 9/95 |
| | | | 60/39.821 |
| 8,122,703 B2 * | 2/2012 | Fisher | F02K 9/52 |
| | | | 60/258 |
| 8,925,518 B1 | 1/2015 | Riley et al. | |
| 2020/0088138 A1 | 3/2020 | Goetz et al. | |

FOREIGN PATENT DOCUMENTS

| | | |
|---|---|---|
| JP | 2020033994 A | 3/2020 |
| KR | 100491808 B1 | 5/2005 |

* cited by examiner

THRUST CHAMBER INTEGRATED WITH IGNITER OF ROCKET ENGINE USING CRYOGENIC FUEL AND LIQUID OXYGEN AND ROCKET INCLUDING THE SAME

CROSS-REFERENCE TO RELATED APPLICATION

This application is based on and claims priority under 35 U.S.C. § 119 to Korean Patent Application No. 10-2020-0134624, filed on Oct. 16, 2020, in the Korean Intellectual Property Office, the disclosure of which is incorporated by reference herein in its entirety.

BACKGROUND

1. Field

One or more embodiments relates to a thrust chamber integrated with an igniter in a rocket engine using a cryogenic fuel and liquid oxygen, and more particularly, to a thrust chamber integrally with a igniter by additive manufacturing through a 3D printing technique.

2. Description of the Related Art

In the related art, in order to ignite a thrust chamber of a rocket engine, it is necessary to use an igniter or an ampoule that includes hypergolic ignition propellant. For example, the thrust chamber is ignited by using a mixing head assembly to which a pyrotechnic igniter is assembled or a mixing head assembly to which a gas torch is assembled or supplying an ampoule containing a hypergolic ignition propellant at a set time.

However, since a mixing head assembly to which a pyrotechnic igniter is assembled is used by combining gunpowder filled therein, only one ignition may be made. Therefore, for multiple ignitions, it is necessary to install an equal number of pyrotechnic igniter head assemblies and individual power supply devices therefor, the overall configuration becomes complicated, and there is a risk of handling gunpowder.

Also, since a mixing head assembly to which a gas torch is assembled uses a gas supplied thereto, multiple ignitions may be made. However, due to limits of machining techniques, a gas torch needs to be fabricated and installed separately from a mixing head, and separate gas containers need to be provided to supply each gas for ignition.

Also, in the case of ignition method using a hypergolic ignition propellant, individual propulsion containers are needed for multiple ignitions and independent components for each containers are needed to be installed. Therefore, the overall configuration becomes complicated and there is a risk of leakage.

The above-described related art is technical information possessed by the inventor for derivation of the present disclosure or acquired during the process of deriving the present disclosure and may not necessarily be known technology disclosed to the general public before the application of the present disclosure.

PRIOR ART DOCUMENTS

Patent Documents (Patent Document 1) Registered Patent Publication No. 10-0491808

SUMMARY

On one or more embodiments include a mixing head assembly integrated with an igniter capable of simplifying the configuration, preventing the risk of leakage, facilitating multiple ignitions, and overcoming the limits of machining techniques.

However, such a technical goal is merely an example, and the technical goal of one or more embodiments are not limited thereto.

Additional aspects will be set forth in part in the description which follows and, in part, will be apparent from the description, or may be learned by practice of the presented embodiments of the disclosure.

According to one or more embodiments, a thrust chamber integrated with an igniter for a rocket engine, the thrust chamber includes a combustion chamber and a mixing head assembly, which is disposed at one side of the combustion chamber and is integrated with the combustion chamber, wherein the mixing head assembly includes a head communicating with an inlet of the combustion chamber; a first manifold, which is disposed at one side of the head and into which an oxidizer flows; a second manifold, which is disposed at the other side of the head and into which a fuel flows; an igniter chamber disposed in an internal space of the head; a first flow path configured to supply the oxidizer from the first manifold to the igniter chamber; a second flow path configured to supply the fuel from the second manifold to the igniter chamber; and a flame injection hole, which is disposed at one side of the igniter chamber to face toward a combustion space disposed inside the combustion chamber.

The mixing head assembly may further include an interface bore for spark plug disposed at the head to be connected to the igniter chamber, and the mixing head may further include a spark plug, which is inserted into the interface bore for spark plug to be partially disposed inside the igniter chamber and generates a spark inside the igniter chamber.

The combustion chamber and the mixing head assembly may be integrally formed by being stacked in a first direction by using an end portion of the combustion chamber nearby an outlet as a stacking base.

The mixing head assembly may further include a first inlet, which is a portion of the head and through which the oxidizer flows; and a second inlet, which is a portion of the head and through which the fuel flows, the first flow path may be disposed inside the first inlet and the oxidizer may flow in from the first inlet, and the second flow path may be disposed inside the second inlet and the fuel may flow in from the second inlet.

The mixing head assembly may further include a partitioning wall, which is disposed in the internal space of the head and defines the first manifold and the second manifold; and a plurality of injectors arranged in the internal space of the head to penetrate through the partitioning wall and configured to inject the fuel and the oxidizer into the combustion chamber, the plurality of injectors may each include a first injection hole through which the oxidizer flows; and a second injection hole through which the fuel flows, and the first injection hole and the second injection hole may be arranged to face each other around the partitioning wall.

The first injection hole may be located above the partitioning wall in the first direction and is connected to a first injection path, which is disposed at one side of the injector and may be connected to the interior of the combustion chamber, and the oxidizer may flow in through the first inlet, and the second injection hole may be located below the partitioning wall in the first direction and may be connected to a second injection path, which is disposed at the other side of the injector and is connected to the interior of the combustion chamber, and the fuel may flow in through the second inlet.

A part of the oxidizer flowed in through the first inlet may flow into the igniter chamber through the first flow path and the remaining of the oxidizer may flow into the combustion chamber through the injectors, and a part of the fuel flowed in through the second inlet may flow into the igniter chamber through the second flow path and the remaining of the fuel may flow into the combustion chamber through the injectors.

The oxidizer may flow into the first manifold along a first connecting path disposed on an outer circumferential surface of the combustion chamber, and the fuel may flow into the second manifold along a second connecting path, which is disposed on the outer circumferential surface of the combustion chamber and is distinguished from the first connecting path.

The oxidizer flowing into the first manifold along the first connecting path may flow in a gaseous state after exchanging heat with the combustion chamber, and the fuel flowing into the second manifold along the second connecting path may flow in the gaseous state after exchanging heat with the combustion chamber.

The fuel may be a cryogenic fuel such like methane or hydrogen, the oxidizer may be liquid oxygen, and no separate ignition gas may be supplied to the mixing head assembly from the outside.

According to one or more embodiments, a rocket includes a fuel tank storing a fuel, an oxidizer tank storing an oxidizer, a rocket engine that generates a propulsion force by receiving the fuel and the oxidizer from the fuel tank and the oxidizer tank, and a mixing head assembly integrated with an igniter for igniting the rocket engine, wherein the mixing head assembly includes a combustion chamber and the mixing head assembly, which is disposed at one side of the combustion chamber and is integrated with the combustion chamber, and the mixing head assembly further includes a head interfacing with a top of the combustion chamber; a first manifold, which is disposed at one side of the head and into which an oxidizer flows; a second manifold, which is disposed at the other side of the head and into which a fuel flows; an igniter chamber disposed in an internal space of the head; a first flow path configured to supply the oxidizer from the first manifold to the igniter chamber; a second flow path configured to supply the fuel from the second manifold to the igniter chamber; and a flame injection hole, which is disposed at one side of the igniter chamber to face toward a combustion space zone disposed inside the combustion chamber.

Other aspects, features, and advantages will become apparent from the following drawings, claims, and detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
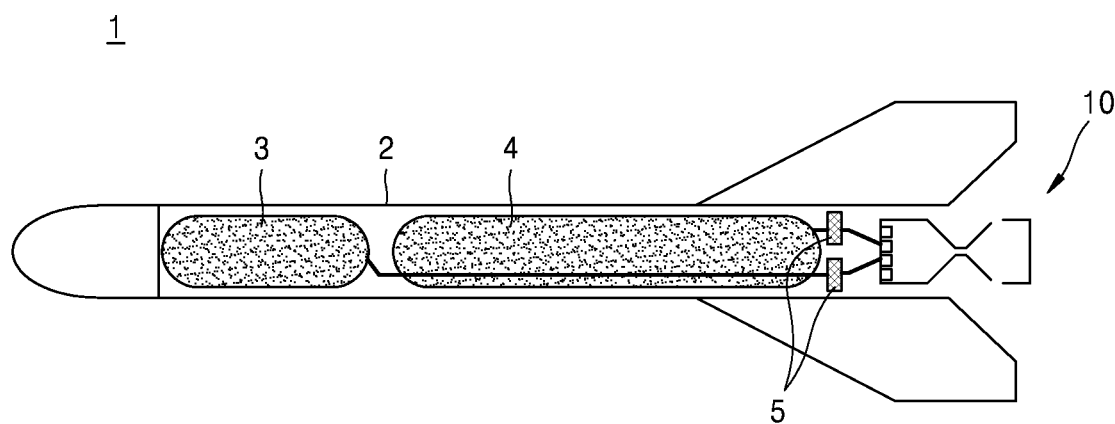
FIG. 1 is a diagram showing a rocket according to one or more embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The one or more embodiments may include various embodiments and modifications, and embodiments thereof will be illustrated in the drawings and will be described herein in detail. However, this is not intended to limit one or more embodiments to particular modes of practice, and it is to be appreciated that all changes, equivalents, and substitutes that do not depart from the spirit and technical scope of one or more embodiments are encompassed in one or more embodiments. Even when shown in different embodiments, the same reference numerals are used for the same elements.

Reference will now be made in detail to embodiments, examples of which are illustrated in the accompanying drawings. In the drawings, the same elements are denoted by the same reference numerals, and a repeated explanation thereof will not be given.

It will be understood that although the terms "first", "second", etc. may be used herein to describe various elements, these elements should not be limited by these terms. These elements are only used to distinguish one element from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

Sizes of elements in the drawings may be exaggerated for convenience of explanation. In other words, since sizes and thicknesses of components in the drawings are arbitrarily illustrated for convenience of explanation, the following embodiments are not limited thereto.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

The terms used in the present specification are merely used to describe particular embodiments, and are not intended to limit the disclosure. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Figure 2:
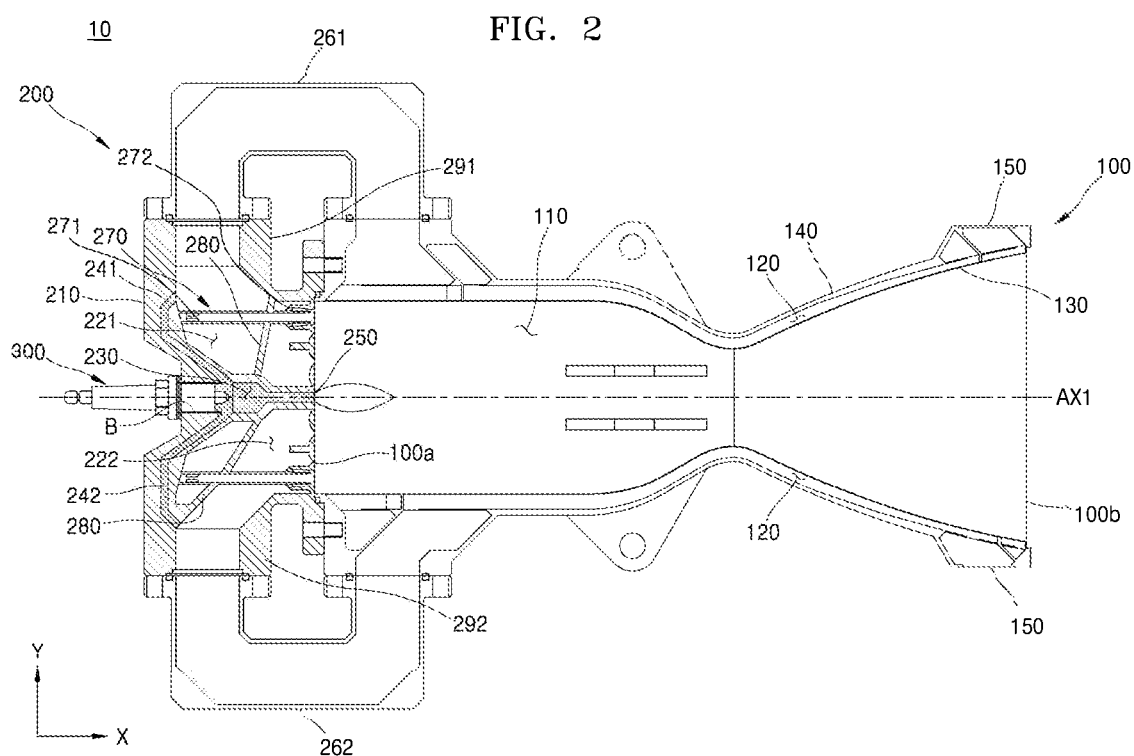
FIG. 2 is a diagram showing a thrust chamber integrated with an igniter according to one or more embodiments.
Figure 3:
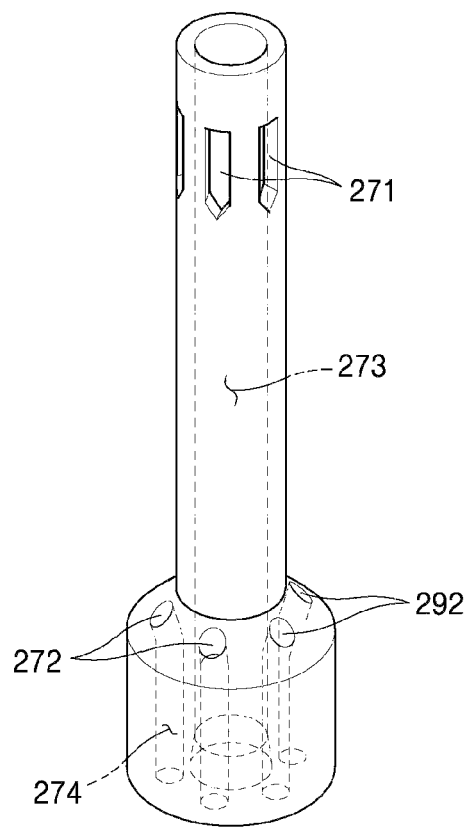
FIG. 3 is an enlarged view of an injector of FIG. 2.

FIG. 1 shows a rocket 1 according to an embodiment, and FIG. 2 shows a thrust chamber 10 integrated with an igniter according to an embodiment. In detail, FIG. 2 is a sectional view of the thrust chamber 10 integrated with an igniter. FIG. 3 is an enlarged view of an injector 270 of FIG. 2.

The rocket 1 according to an embodiment is a rocket that is propelled by using a fuel and an oxidizer.

Referring to FIG. 1, the rocket 1 may include a main body 2, an oxidizer tank 3, a fuel tank 4, a pump 5, and the thrust chamber 10.

Other components of the rocket 1 are arranged inside or outside the main body 2 and are supported by the main body 2. The shape of the main body 2 may have the outer shape of a common rocket. For example, the main body 2 may extend in the lengthwise direction and a leading end thereof may have a streamlined shape.

The oxidizer tank 3 is disposed on one side inside the rocket 1 and stores an oxidizer. An oxidizer stored therein is supplied to the thrust chamber 10. For example, the oxidizer may be liquid oxygen.

The fuel tank 4 is disposed on the other side inside the rocket 1 and stores a fuel. A fuel stored therein is supplied to the thrust chamber 10. For example, the fuel may be liquid hydrogen or liquid methane, which is an example of cryogenic fuels.

The pump 5 is connected to the oxidizer tank 3 and the fuel tank 4 and supplies an oxidizer and a fuel to the thrust chamber 10 by pressing the oxidizer and the fuel.

The thrust chamber 10 is provide at one side of the rocket 1 and generates a propulsion force. For example, as shown in FIG. 1, the thrust chamber 10 is disposed at the rear of the rocket 1 and obtains a propulsion force by combusting a fuel and an oxidizer supplied thereto and discharging the same at a high speed.

Referring to FIGS. 2 and 3, the thrust chamber 10 according to an embodiment may be a thrust chamber integrated with an igniter. In other words, the thrust chamber 10 may include a combustion chamber 100 that generates a propulsion force by combusting a fuel and an oxidizer and a mixing head assembly 200 that supplies ignition flame into the combustion chamber 100 by igniting the fuel and the oxidizer and supplying the fuel and the oxidizer, wherein the combustion chamber 100 and the mixing head assembly 200 are integrated with each other.

Referring to FIG. 2, the combustor 10 according to an embodiment may include the combustion chamber 100 and the mixing head assembly 200.

The combustion chamber 100 is disposed at one side of the thrust chamber 10 and may have a center axis Ax1. An inlet 100a through which a fuel and an oxidizer injected from the mixing head assembly 200 may be provided on one side of the combustion chamber 100, whereas an outlet 100b through which the combustion gas mixture is discharged may be provided on the other side of the combustion chamber 100. The shape and the size of the combustion chamber 100 are not particularly limited, and the combustion chamber 100 may have a shape and a size of a combustion chamber included in a common rocket.

According to an embodiment, the combustion chamber 100 may generate a propulsion force by combusting a fuel and an oxidizer supplied from the mixing head assembly 200. To this end, the combustion chamber 100 may include a combustion space 110 therein.

According to an embodiment, the combustion chamber 100 may include a cooling channel 120 for the cooling of inner wall 130. In detail, as shown in FIG. 2, the combustion chamber 100 includes an inner wall 130 and an outer jacket 140, and the cooling channel 120 may be disposed along the outer circumferential surface of the inner wall 130. Here, the outer jacket 140 may cover the top surface of the cooling channel 120 disposed on the outer circumferential surface of the inner wall 130.

Also, inlets 150 through which a fuel and an oxidizer supplied and diverged from the fuel tank 4 and the oxidizer tank 3 may be arranged at one side and the other side of the combustion chamber 100. Temperatures of a fuel and an oxidizer supplied to the combustion space 110 are relatively low as compared to the combustion chamber 100 that is at a high temperature due to combustion occurring in the combustion space 110, the fuel and the oxidizer flow along the cooling channel 120 and absorb heat from the combustion chamber 100. Therefore, the combustion chamber 100 is cooled by the flow of the fuel and the oxidizer, and the fuel and the oxidizer with increased temperatures flow out of the cooling channel 120 while the temperatures thereof are increased. According to an embodiment, the fuel and the oxidizer flowed out of the cooling channel 120 may be supplied into the mixing head assembly 200 through respective flow paths.

The mixing head assembly 200 is provided at one side of the combustion chamber 100 and ignites the fuel and the oxidizer supplied thereto. Ignition flame generated by the ignition is released into combustion chamber 100 and cause combustion to occur inside combustion chamber 100.

According to an embodiment, the mixing head assembly 200 may include a head 210, a first manifold 221, a second manifold 222, an igniter chamber 230, a first flow path 241, a second flow path 242, and a flame injection hole 250.

The head 210 is the main body of the mixing head assembly 200 and supports and fixes other components of the mixing head assembly 200. The shape and the size of the head 210 are not particularly limited and may correspond to the capacity of the rocket 1 or the shape and the size of the combustion chamber 100. According to an embodiment, the head 210 may be provided, such that a surface (i.e., an injection surface from which an oxidizer and a fuel are injected) thereof faces toward inlet 100a of the combustion chamber 100.

The first manifold 221 is disposed at one side of the head 210 and an oxidizer may be supplied thereto. For example, the first manifold 221 may be defined at one side of the internal space of the head 210, and an oxidizer flowing along the cooling channel 120 of the combustion chamber 100 may be supplied thereto through a first connecting path 261. A part of a supplied oxidizer flows into the igniter chamber 230 through the first flow path 241, and the remaining of the supplied oxidizer may be directly injected into the interior of the combustion chamber 100 through the injector 270. Detailed description thereof will be given later.

The second manifold 222 is disposed at the other side of the head 210 and a fuel may be supplied thereto. For example, the second manifold 222 may be defined at the other side of the internal space of the head 210, and a fuel flowing along the cooling channel 120 of the combustion chamber 100 may be supplied thereto through a second connecting path 262. A part of a supplied fuel flows into the igniter chamber 230 through the second flow path 242, and the remaining of the supplied fuel may be directly injected into the interior of the combustion chamber 100 through the injector 270. Detailed description thereof will be given later.

According to an embodiment, the first manifold 221 and the second manifold 222 may be defined by a partitioning wall 280. For example, as shown in FIG. 2, the partitioning wall 280 may be provided to extend across the internal space of the head 210. In detail, the partitioning wall 280 may radially extend from the outer wall of the igniter chamber 230 and be connected to the inner wall of the head 210. Therefore, the internal space of the head 210 may be divided into two separated spaces, wherein one space may become the first manifold 221, and the other space may become the second manifold 222.

According to an embodiment, the first manifold 221 defined by the partitioning wall 280 may be a space into which an oxidizer is supplied from the combustion chamber 100. Also, the second manifold 222 may be a space into which a fuel is supplied from the combustion chamber 100.

According to an embodiment, the partitioning wall 280 may extend from the outer wall of the igniter chamber 230 in a direction tilted at a predetermined angle instead of extending in parallel in the radial direction. In detail, as shown in FIG. 2, the partitioning wall 280 may extend from a lower inner portion of a first inlet 291 and be connected to an upper inner portion of a second inlet 292.

The igniter chamber 230 may be provided in the internal space of the head 210. In detail, as shown in FIG. 2, the igniter chamber 230 is provided coaxially with the center axis Ax1, an oxidizer is supplied from the first flow path 241, and a fuel is supplied from the second flow path 242. Also, ignition occurs when a spark plug 300 described later generates a spark inside the igniter chamber 230.

The first flow path 241 supplies an oxidizer from the first manifold 221 to the igniter chamber 230. In detail, as shown in FIG. 2, the first flow path 241 may be disposed on the inner wall of the head 210, that is, inside the first inlet 291.

The second flow path 242 supplies a fuel from the second manifold 222 to the igniter chamber 230. In detail, as shown in FIG. 2, the second flow path 242 may be disposed on the inner wall of the head 210, that is, inside the second inlet 292.

The flame injection hole 250 injects ignition flame generated in the igniter chamber 230 into the combustion chamber 100. In detail, as shown in FIG. 2, the flame injection hole 250 is disposed at one side of the igniter chamber 230 to face toward the combustion space 110 provided inside the combustion chamber 100. When ignition occurs in the igniter chamber 230, ignition flame is stretched through the flame injection hole 250, and thus an oxidizer and a fuel injected into the combustion space 110 of the combustion chamber 100 are combusted.

According to an embodiment, the flame injection hole 250 may be disposed coaxially with the center axis Ax1.

According to an embodiment, the mixing head assembly 200 may further include an interface bore for spark plug B connected to the igniter chamber 230. In detail, as shown in FIG. 2, the interface bore for spark plug B is disposed coaxially with the center axis Ax1 and may be disposed at one side of the head 210.

According to an embodiment, the thrust chamber 10 according to one or more embodiments may further include the spark plug 300 inserted into the interface bore for spark plug B. In detail, as shown in FIG. 2, the spark plug 300 may be inserted into the interface bore for spark plug B, such that a portion of the spark plug 300 is disposed inside the igniter chamber 230. The spark plug 300 generates a spark inside the igniter chamber 230, thereby igniting a fuel and an oxidizer inside the igniter chamber 230. Therefore, generated ignition flame may be injected into the combustion space 110 of the combustion chamber 100 through the flame injection hole 250.

According to an embodiment, the spark plug 300 may be a member separate from the combustion chamber 100 and the mixing head assembly 200 and may be attached and detached through the interface bore for spark plug B of the mixing head assembly 200.

According to an embodiment, the mixing head assembly 200 may further include the first inlet 291 and the second inlet 292. In detail, as shown in FIG. 2, the first inlet 291 is a portion of the head 210 and may connect the first connecting path 261 and the first manifold 221, such that an oxidizer passed through the cooling channel 120 of the combustion chamber 100 is supplied.

According to an embodiment, the first inlet 291 is an annular member having a predetermined thickness, wherein the first flow path 241 may be disposed inside the first inlet 291. An inlet of the first flow path 241 is opened toward the first manifold 221, and an outlet of the first flow path 241 may be connected to the igniter chamber 230. Therefore, an oxidizer supplied through the first inlet 291 may be partially supplied to the igniter chamber 230 through the first flow path 241.

The second inlet 292 is a portion of the head 210 and may connect the second connecting path 262 and the second manifold 222, such that an oxidizer passed through the cooling channel 120 of the combustion chamber 100 is supplied.

According to an embodiment, the second inlet 292 is an annular member having a predetermined thickness, wherein the second flow path 242 may be disposed inside the second inlet 292. An inlet of the second flow path 242 is opened toward the second manifold 222, and an outlet of the second flow path 242 may be connected to the igniter chamber 230. Therefore, an oxidizer supplied through the second inlet 292 may be partially supplied to the igniter chamber 230 through the second flow path 242.

According to an embodiment, the mixing head assembly 200 may further include the injector 270. In detail, the injector 270 may be disposed in the internal space of the head 210 and to penetrate through the partitioning wall 280. Also, an end of the injector 270 may be connected to the inner bottom surface of the head 210 (that is, an injection surface), and the other end of the injector 270 may be connected to the inner top surface of the head 210.

According to an embodiment, the injector 270 may inject an oxidizer and a fuel into the combustion chamber 100. In detail, as shown in FIGS. 2 and 3, the injector 270 may include a first injection hole 271 through which an oxidizer is supplied and a second injection hole 272 through which a fuel is supplied.

A plurality of first injection holes 271 may be arranged in the upper portion of the injector 270. For example, the plurality of first injection holes 271 may be arranged in the circumferential direction along the outer circumferential surface of the injector 270. The first injection hole 271 is an inlet through which an oxidizer supplied into the first manifold 221 flows in and is connected to a first injection flow path 273 provided inside the injector 270. Therefore, the oxidizer may be injected into the combustion space 110 of the combustion chamber 100 through the first injection flow path 273.

A plurality of second injection holes 272 may be arranged in the lower portion of the injector 270. For example, the plurality of second injection holes 272 may be arranged in the lower portion of the injector 270 in the circumferential direction along the outer circumferential surface of the injector 270. The second injection hole 272 is an inlet through which a fuel supplied into the second manifold 222 flows in and is connected to a second injection flow path 274 provided inside the injector 270. Therefore, the fuel may be injected into the combustion space 110 of the combustion chamber 100 through the second injection flow path 274.

According to an embodiment, the first injection hole 271 and the second injection hole 272 may be arranged to face each other around the partitioning wall 280.

According to an embodiment, the first injection hole 271 and the second injection hole 272 may be arrange at different locations in a first direction (e.g., the X-axis direction of FIG. 2) around the partitioning wall 280. In detail, as shown in FIG. 2, the first injection hole 271 may be located above the partitioning wall 280, whereas the second injection hole 272 may be located below the partitioning wall 280. Alternatively, the first injection hole 271 may be located in the first manifold 221, whereas the second injection hole 272 may be located in the second manifold 222.

Therefore, an oxidizer supplied into the first manifold 221 and a fuel supplied into the second manifold 222 may be injected into the combustion space 110 of the combustion chamber 100 along different paths (the first injection hole 271 and the first injection flow path 273 and the second injection hole 272 and the second injection flow path 274) without being mixed with each other.

According to an embodiment, the mixing head assembly 200 may be supplied an oxidizer through the first connecting path 261 provided on the outer circumferential surface of the combustion chamber 100. In detail, as shown in FIG. 2, the first connecting path 261 is disposed on one side of the outer circumferential surface of the combustion chamber 100 and may be a flow path to which an oxidizer passed through the cooling channel 120 is supplied. According to an embodiment, an oxidizer may flow through the first connecting path 261 in the gaseous state after exchanging heat with the combustion chamber 100 in the cooling channel 120 and may flow into the first manifold 221.

According to an embodiment, the mixing head assembly 200 may be supplied a fuel through the second connecting path 262 provided on the outer circumferential surface of the combustion chamber 100. In detail, as shown in FIG. 2, the second connecting path 262 is disposed on one side of the outer circumferential surface of the combustion chamber 100 and may be a flow path to which a fuel passed through the cooling channel 120 is supplied. According to an embodiment, a fuel may flow through the second connecting path 262 in the gaseous state after exchanging heat with the combustion chamber 100 in the cooling channel 120 and may flow into the second manifold 222.

The spark plug 300 ignites an oxidizer and a fuel by generating a spark. According to an embodiment, as shown in FIG. 2, the spark plug 300 is inserted into the interface bore for spark plug B of the mixing head assembly 200 and may generate a spark inside the igniter chamber 230. Therefore, an oxidizer and a fuel inside the igniter chamber 230 are ignited, and generated ignition flame is injected into the combustion space 110 of the combustion chamber 100 through the flame injection hole 250.

According to an embodiment, the combustion chamber 100 and the mixing head assembly 200 of the combustor 10 integrated with an igniter according to one or more embodiments may be formed by additive manufacturing. For example, the combustor 10 integrated with an igniter may be integrally formed by being stacked in the first direction (the X-axis direction of FIG. 2) by using the outlet 100b of the combustion chamber 100 as a stacking base surface. According to an embodiment, the combustion chamber 100 and the mixing head assembly 200 of the thrust chamber 10 integrated with an igniter according to one or more embodiments may be formed by additive manufacturing through 3D printing.

In the thrust chamber 10 integrated with an igniter for a rocket engine according to one or more embodiments and the rocket 1 including the same, the mixing head assembly 200 and the combustion chamber 100 are integrated with each other, thereby simplifying the overall configuration, reducing the risk of leakage, and facilitating multiple ignitions. Also, the thrust chamber 10 integrated with an igniter for a rocket engine according to one or more embodiments and the rocket 1 including the same may be easily manufactured through 3D printing as compared to previous machining techniques.

The thrust chamber 10 integrated with an igniter for a rocket engine according to one or more embodiments and the rocket 1 including the same are formed by additive manufacturing by using a 3D printing technique, and thus the combustion chamber 100 integrated with the mixing head assembly 200, which cannot be implemented by using previous machining techniques, may be provided.

In the thrust chamber 10 integrated with an igniter for a rocket engine according to one or more embodiments and the rocket 1 including the same, when a cryogenic fuel like liquid hydrogen and an oxidizer like liquid oxygen are used, a gas torch-type igniter using a fuel may be configured, and thus it is not necessary to provide a separate member for supplying gas. Therefore, the thrust chamber 10 integrated with an igniter for a rocket engine according to one or more embodiments and the rocket 1 including the same may perform multiple ignitions with the spark plug 300 and a power supply device (not shown) only.

In a thrust chamber integrated with an igniter for a rocket engine according to one or more embodiments and a rocket including the same, an igniter and the thrust chamber are integrally implemented for simplification of configuration, thereby reducing the risk of leakage during assembly, facilitating multiple ignitions, and enabling easy manufacture as compared to the case of using previous machining techniques.

A thrust chamber integrated with an igniter for a rocket engine according to one or more embodiments and a rocket including the same are formed by additive manufacturing by using a 3D printing technique, and thus the thrust chamber integrated with the igniter, which cannot be implemented by using previous machining techniques, may be provided.

In a thrust chamber integrated with an igniter for a rocket engine according to one or more embodiments and a rocket including the same, when a cryogenic fuel like liquid hydrogen and an oxidizer like liquid oxygen are used, a gas torch-type igniter using a fuel may be configured, and thus it is not necessary to provide a separate member for supplying gas. Therefore, a thrust chamber integrated with an igniter for a rocket engine according to one or more embodiments and a rocket including the same may perform multiple ignitions with a spark plug and a power supply device (not shown) only.

One or more embodiments have been described with reference to the embodiments shown in the drawings, but it is merely an example. One of ordinary skill in the art will fully understand that various modifications and equivalent embodiments may be made from the embodiments. Thus, the technical scope of one or more embodiments for protection should be determined based on the appended claims.

The specific technical contents described in the embodiments are merely examples and are not limiting the technical scope of the embodiments. In order to simplify and clarify the descriptions of one or more embodiments, descriptions of the conventional general techniques and configurations may be omitted. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. One or more embodiments are not limited to the order the above steps are stated. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A thrust chamber integrated with an igniter for a rocket engine that comprises
   a combustion chamber and a mixing head assembly, which is disposed at one side of the combustion chamber and is integrated with the combustion chamber,
   wherein the mixing head assembly comprises:
      a head including an injection surface communicating with an inlet of the combustion chamber, and an internal space located inside the head;
      a first manifold, which is disposed inside a first portion of the internal space of the head and into which an oxidizer flows into an empty space inside the first manifold;
      a second manifold, which is disposed inside a second portion of the internal space of the head and into which a fuel flows into an empty space inside the second manifold;
      an igniter chamber disposed inside a third portion of the internal space of the head;
      a first flow path configured to supply the oxidizer from the first manifold to the igniter chamber;
      a second flow path configured to supply the fuel from the second manifold to the igniter chamber;
      a plurality of injectors extending upward from the injection surface through the internal space and contacting an inner upper surface of the head, the plurality of injectors communicating with the first manifold and the second manifold, respectively, and
      a partitioning wall partitioning the internal space of the head into the first manifold and the second manifold, the partitioning wall extending radially outward around the igniter chamber and contacting a radially inner surface of the head,
      wherein each one of the plurality of injectors has a pillar shape parallel to a center axis of the combustion chamber and are exposed to the empty spaces of the first manifold and the second manifold,
      wherein each one of the plurality of the injectors comprises:
         a first part having a hollow cylindrical shape with a first diameter;
         a first injection path formed inside the first part;
         a plurality of first injection holes formed on an upper outer peripheral surface of the first part and communicating with the first manifold and the first injection path;
         a second part formed on a lower outer peripheral surface of the first part, the second part having a second diameter that is greater than the first diameter of the first part;
         a second injection path formed inside the second part;
         a plurality of second injection holes formed on an upper surface of the second part and communicating with the second manifold and the second injection path, and
      wherein the combustion chamber and the mixing head assembly are integrally formed by additive manufacturing through 3D printing.

2. The thrust chamber of claim 1, wherein
   the mixing head assembly further comprises an interface bore for a spark plug disposed at the head to be connected to the igniter chamber, and
   the mixing head further comprises the spark plug, which is inserted into the interface bore for the spark plug to be partially disposed inside the igniter chamber and generates a spark inside the igniter chamber.

3. The thrust chamber of claim 1, wherein the combustion chamber and the mixing head assembly are integrally formed by being stacked in a first direction by using an end portion of the combustion chamber nearby an outlet as a stacking base.

4. The thrust chamber of claim 1, wherein the mixing head assembly further comprises:
   a first inlet, which is a portion of the head and through which the oxidizer flows; and
   a second inlet, which is a portion of the head and through which the fuel flows,
   the first flow path is disposed inside the first inlet and the oxidizer flows in from the first inlet, and
   the second flow path is disposed inside the second inlet and the fuel flows in from the second inlet.

5. The thrust chamber of claim 4, wherein the plurality of injectors are arranged in the internal space of the head to penetrate through the partitioning wall, and wherein the plurality of first injection holes are disposed in the first manifold side of the partitioning wall in a first direction along the center axis, and wherein the plurality of second injection holes are disposed in the second manifold side of the partitioning wall in a second direction opposite to the first direction.

6. The thrust chamber of claim 5, wherein
the plurality of first injection holes are located above the partitioning wall in the first direction and are directly connected to the first injection path, wherein the plurality of first injection holes are disposed in the first part and are fluidly connected to the combustion space of the combustion chamber, and the oxidizer flows in through the first inlet, and
the plurality of second injection holes are located below the partitioning wall in the second direction and are directly connected to the second injection path, wherein the plurality of second injection holes are disposed in the second part and are fluidly connected to the combustion space of the combustion chamber, and the fuel flows in through the second inlet.

7. The thrust chamber of claim 1, wherein
the oxidizer flows into the first manifold along a first connecting path disposed on an outer circumferential surface of the combustion chamber, and
the fuel flows into the second manifold along a second connecting path, which is disposed on the outer circumferential surface of the combustion chamber and is distinguished from the first connecting path.

8. The thrust chamber of claim 7, wherein
the oxidizer flowing into the first manifold along the first connecting path flows in a gaseous state after exchanging heat with the combustion chamber, and
the fuel flowing into the second manifold along the second connecting path flows in the gaseous state after exchanging heat with the combustion chamber.

9. The thrust chamber of claim 1, wherein
the fuel is a cryogenic fuel comprising methane or hydrogen,
the oxidizer is liquid oxygen, and
no separate ignition gas is supplied to the mixing head assembly from the outside.

10. A rocket comprising:
a fuel tank storing a fuel, an oxidizer tank storing an oxidizer, a rocket engine that generates a propulsion force by receiving the fuel and the oxidizer from the fuel tank and the oxidizer tank, and a mixing head assembly integrated with an igniter for igniting the rocket engine,
wherein the rocket engine comprises a combustion chamber and the mixing head assembly, which is disposed at one side of the combustion chamber and is integrated with the combustion chamber, and the mixing head assembly further comprises:
a head including an injection surface communicating with an inlet of the combustion chamber, and an internal space located inside the head;
a first manifold, which is disposed inside a first portion of the internal space of the head and into which an oxidizer flows into an empty space inside the first manifold;
a second manifold, which is disposed inside a second portion of the internal space of the head and into which a fuel flows into an empty space inside the second manifold;
an igniter chamber disposed inside a third portion of the internal space of the head;
a first flow path configured to supply the oxidizer from the first manifold to the igniter chamber;
a second flow path configured to supply the fuel from the second manifold to the igniter chamber;
a plurality of injectors extending upward from the injection surface through the internal space and contacting an inner upper surface of the head, the plurality of injectors communicating with the first manifold and the second manifold, respectively, and
a partitioning wall partitioning the internal space of the head into the first manifold and the second manifold, the partitioning wall extending radially outward around the igniter chamber and contacting a radially inner surface of the head,
wherein each one of the plurality of injectors has a pillar shape parallel to a center axis of the combustion chamber and are exposed to the empty spaces of the first manifold and the second manifold,
wherein each one of the plurality of the injectors comprises:
a first part having a hollow cylindrical shape with a first diameter;
a first injection path formed inside the first part;
a plurality of first injection holes formed on an upper outer peripheral surface of the first part and communicating with the first manifold and the first injection path;
a second part formed on a lower outer peripheral surface of the first part, the second part having a second diameter that is greater than the first diameter of the first part;
a second injection path formed inside the second part;
a plurality of second injection holes formed on an upper surface of the second part and communicating with the second manifold and the second injection path, and
wherein the combustion chamber and the mixing head assembly are integrally formed by additive manufacturing through 3D printing.

11. The rocket of claim 10, wherein
the mixing head assembly further comprises an interface bore for a spark plug disposed at the head to be connected to the igniter chamber, and
the mixing head further comprises the spark plug, which is inserted into the interface bore for the spark plug to be partially disposed inside the igniter chamber and generates a spark inside the igniter chamber.

12. The rocket of claim 10, wherein the combustion chamber and the mixing head assembly are integrally formed by being stacked in a first direction by using an end portion of the combustion chamber nearby an outlet as a stacking base.

13. The rocket of claim 10, wherein the mixing head assembly further comprises:
a first inlet, which is a portion of the head and through which the oxidizer flows; and
a second inlet, which is a portion of the head and through which the fuel flows,
the first flow path is disposed inside the first inlet and the oxidizer flows in from the first inlet, and
the second flow path is disposed inside the second inlet and the fuel flows in from the second inlet.

14. The thrust chamber of claim 4, wherein the plurality of injectors are arranged in the internal space of the head to penetrate through the partitioning wall, and wherein the plurality of first injection holes are disposed in the first manifold side of the partitioning wall in a first direction along the center axis, and wherein the plurality of second injection holes are disposed in the second manifold side of the partitioning wall in a second direction opposite to the first direction.

15. The thrust chamber of claim 5, wherein
the plurality of first injection holes are located above the partitioning wall in the first direction and are directly connected to the first injection path, wherein the plurality of first injection holes are disposed in the first part and are fluidly connected to the combustion space of the combustion chamber, and the oxidizer flows in through the first inlet, and
the plurality of second injection holes are located below the partitioning wall in the second direction and are directly connected to the second injection path, wherein the plurality of second injection holes are disposed in the second part and are fluidly connected to the combustion space of the combustion chamber, and the fuel flows in through the second inlet.

16. The rocket of claim 10, wherein
the oxidizer flows into the first manifold along a first connecting path disposed on an outer circumferential surface of the combustion chamber, and
the fuel flows into the second manifold along a second connecting path, which is disposed on the outer circumferential surface of the combustion chamber and is distinguished from the first connecting path.

17. The rocket of claim 16, wherein
the oxidizer flowing into the first manifold along the first connecting path flows in a gaseous state after exchanging heat with the combustion chamber, and
the fuel flowing into the second manifold along the second connecting path flows in the gaseous state after exchanging heat with the combustion chamber.

18. The rocket of claim 10, wherein
the fuel is a cryogenic fuel comprising methane or hydrogen,
the oxidizer is liquid oxygen, and
no separate ignition gas is supplied to the mixing head assembly from the outside.

* * * * *